United States Patent [19]

Dwořak et al.

[11] Patent Number: 4,526,824

[45] Date of Patent: Jul. 2, 1985

[54] THERMAL INSULATION LINING OF CERAMIC MATERIAL FOR A HOT GAS DUCT ENVELOPED IN METAL

[75] Inventors: Ulf Dworak, Baltmannsweiler; Hans Olapinski, Aichwald; Dieter Fingerle, Hochdorf; Ulrich Krohn, Leonberg, all of Fed. Rep. of Germany

[73] Assignee: Feldmühle Aktiengesellschaft, Düsseldorf, Fed. Rep. of Germany

[21] Appl. No.: 587,035

[22] Filed: Mar. 7, 1984

[30] Foreign Application Priority Data

Mar. 18, 1983 [DE] Fed. Rep. of Germany ....... 3309699

[51] Int. Cl.[3] .......................... B32B 5/08; B05D 1/36

[52] U.S. Cl. ........................................ 428/35; 428/36; 428/302; 428/303; 428/329; 428/448; 428/332; 428/920; 428/701; 428/697; 427/201; 427/427; 427/419.3; 123/193 CH

[58] Field of Search ................ 428/332, 920, 448, 35, 428/329, 302, 303, 697, 701; 427/201, 427

[56] References Cited

U.S. PATENT DOCUMENTS

| | | | |
|---|---|---|---|
| 4,008,109 | 2/1977 | Norton | 428/920 |
| 4,104,426 | 8/1978 | Gonzalez | 428/920 |
| 4,341,826 | 7/1982 | Prewo et al. | 428/35 |
| 4,447,345 | 5/1984 | Kummermehr et al. | 428/920 |

*Primary Examiner*—Patricia C. Ives

*Attorney, Agent, or Firm*—Felfe & Lynch

[57] ABSTRACT

A thermal insulation lining (1) in the exhaust duct (4) of a cylinder head (5) consists of a sintered compact (2) of ceramic material having an envelope containing or consisting of inorganic fibers.

12 Claims, 1 Drawing Figure

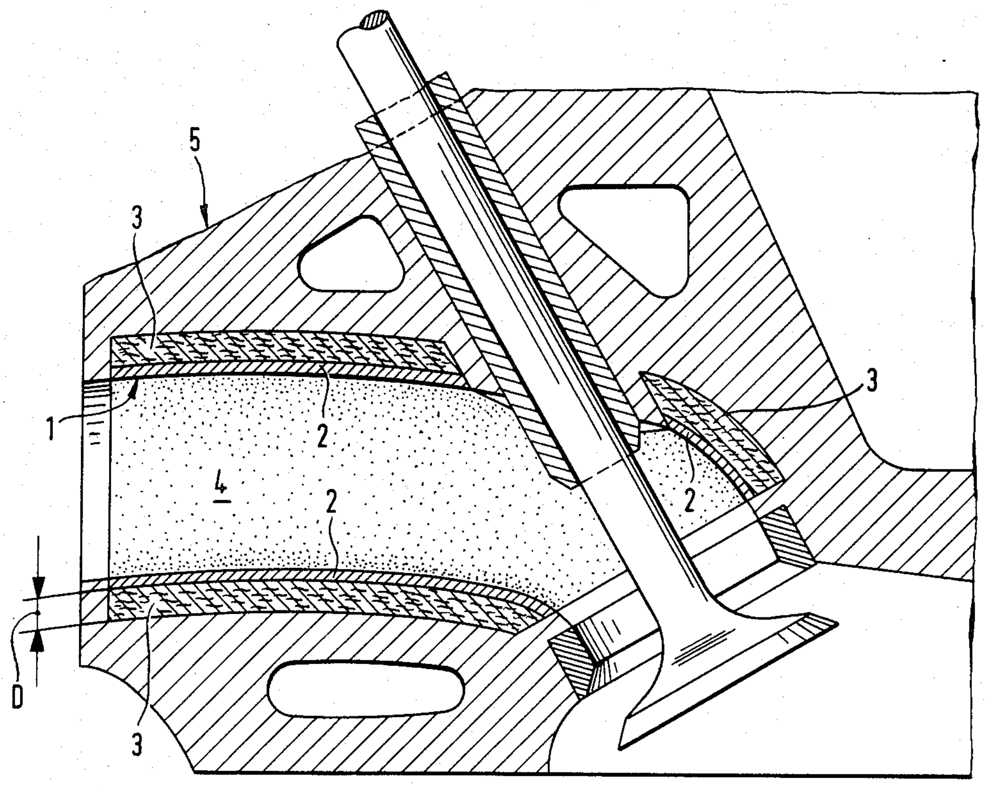
5
3
3
1
2
4
2
2
D
3

THERMAL INSULATION LINING OF CERAMIC MATERIAL FOR A HOT GAS DUCT ENVELOPED IN METAL

The invention relates to a thermal insulation lining of ceramic material for a hot gas duct encased in metal, especially in the cylinder head of an internal combustion engine, and a method of producing same.

Thermal insulation linings in the form of hollow sintered compacts of ceramic materials and their use in hot gas ducts, such as for example exhaust ducts in the cylinder head and exhaust elbows, are known. These hollow sintered compacts are encased in metal by the casting of a cylinder head, for example, during which the interior of the hollow sintered compact can be filled with casting sand so as to prevent it from being destroyed by the pressures to which it is subject in casting.

Prior-art methods of making hollow sintered compacts from ceramics for encasement in metal are described in German Pat. Nos. 2,163,717 and 2,354,254. These proposals call for mixtures of silicon oxide and aluminum oxide in the one case, and in the other case, for fireclay, alumina, silica, sillimanite, mullite, zirconium, chromite, magnesia clinker, silicon carbide, electrocorundum, opaque fused silica, kyanite, magnesia, fused spinel, silicon nitride, chrome magnesia, chrome magnesite, vermiculite, vermiculite asbestos, heavy spar, burnt diatomaceous earth, and pumice, bound by argillaceous earth or aluminum phosphate, for the production of the sintered compacts.

Disadvantages of these proposals are the excessively low insulating power, as in the case of silicon carbide and aluminum oxide, for example, while sintered compacts made of other materials, such as opaque fused silica, for example, do not have adequate strength.

German Auslegeschrift 2,750,290 calls for an aluminum titanate containing 50 to 60 wt.% of aluminum oxide, 40 to 45 wt.% of titanium oxide, 2 to 5 wt.% of kaolin, and 0.1 to 1 wt.% of magnesium silicate, plus material characteristics tailored to the application involved. Although aluminum titanate has a very low thermal conductivity, this patent has not been widely applied. One disadvantage is especially the still excessively low strength of aluminum titanate, and the fact that only slight wall thicknesses of about 2 to 3 mm can be achieved in the sintered compact, so that the insulating effect that can actually be achieved still remains unsatisfactory. Particularly in the case of hot gas ducts encased in aluminum, great energy losses are involved on account of the poor thermal stability of aluminum and the resultant need for intensive cooling.

It is therefore the object of the present invention to eliminate these known disadvantages and to improve the thermal insulating action and the resistance to thermal and mechanical stresses of the sintered compacts which have been proposed for thermal insulation linings. In particular, the invention purports to offer a thermal insulation lining which will also be suitable for encasement in aluminum, while at the same time having an excellent insulating action and an improved resistance to thermal and mechanical stresses.

Another object of the invention is to use even those ceramic materials which of themselves have not found widespread use heretofore on account of their insufficient insulating action and/or their low resistance to mechanical and thermal stresses in the known structural configurations.

THE INVENTION

For the achievement of these objects, the present invention provides for a thermal insulation lining of ceramic material for a metal-encased hot gas duct, especially in the cylinder head of an internal combustion engine, which is characterized by the fact that the thermal insulation lining consists of a sintered compact of ceramic material encased in a jacket containing inorganic fibers or consisting thereof.

The present invention makes it possible to produce thermal insulation linings of considerably greater wall thickness for hot gas ducts which are to be encased in metal, and thereby to achieve improved insulating action. The wall thickness of the thermal insulation lining of the invention can be as much as three times that of the sintered compacts heretofore proposed for this application. The invention thus makes it possible to make cylinder heads and their attached exhaust ducts of aluminum instead of gray iron, without thereby requiring provisions for greater cooling. The thermal insulation lining of the invention, however, is also outstandingly suited for encasement in gray iron, especially when the wall thickness of the gray iron casing is very great and therefore results in great compressive forces as the iron solidifies. The resilient fiber envelope serves as a buffer against the compressive forces produced by the solidification of the molten iron, and prevents deformation or destruction of the thermal insulation lining by compensating for peak tensions produced by accumulations of mass, especially in the casting of gray iron, but also in the casting of aluminum.

The thermal insulation lining in accordance with the invention is produced by first making a compact from ceramic material in a known manner, e.g., by slip casting, and sintering it in the usual manner. Then the compact is covered with a jacket containing or consisting of inorganic fibers. For this purpose the inorganic fibers are mixed with an organic or inorganic binding agent and applied to the sintered compact. Preferably the inorganic binding agent is the same ceramic material of which the compact to be covered by the fibers is made. To achieve an optimum resistance of the thermal insulation lining while molten metal is being cast around it, especially molten gray iron, it has been found advantageous to prepare the jacket only from those inorganic fibers which have a short-term heat resistance up to 1500° C. Mineral fibers have proven outstandingly suitable for this purpose, especially fibers of aluminum oxide, zirconium oxide, mullite or kaolinite.

The thickness of the coat is substantially what determines its handling characteristics when it is embedded in molten metal, and its thermal insulating action. Thicknesses of 1 to 7 mm have proven to be especially suitable.

The following have proven particularly suitable ceramic materials for the production of the sintered compact to be covered with inorganic fibers: mullite, zirconium oxide, magnesium aluminum silicate (MAS), especially cordierite, magnesium aluminum titanate (MAT), aluminum titanate (AT) or lithium aluminum silicate (LAS), of which aluminum titanate is outstandingly suitable. Mixtures of these ceramic substances are also suitable for the preparation of the sintered compact.

For the binding of the inorganic fibers to the compact, the above-named ceramic materials are used, in an especially desirable embodiment, in the form of slips. In an especially preferred embodiment of the invention, slips of those ceramic materials are used from which the sintered compact being enveloped is prepared. In this case a very especially preferred embodiment has proven to be a compact of aluminum titante which is enveloped in a jacket of inorganic fibers which are fastened to the compact with aluminum titanate as the binding agent.

However, organic binding agents can also be used in the coating process. Even though these binding agents are burned out when the coat of inorganic fibers has been applied, for the purpose of driving off water or solvent, the adhesion of the inorganic fibers to the compact is sufficient for many kinds of applications. In this case the coating consists only of inorganic fibers.

An especially preferred method for the production of the thermal insulating lining of the invention is to spray inorganic fibers contained in a slip consisting of ceramic material, onto the sintered compacts made from ceramic material.

BRIEF DESCRIPTION OF THE DRAWING

The FIGURE shows an exhaust duct in an internal combustion engine cylinder head, wih the thermal lining of the invention.

DESCRIPTION OF A PREFERRED EMBODIMENT

In the drawing there is represented an exhaust duct 4 in a fragmentarily represented cylinder head 5 of an internal combustion engine. The thermal insulation lining 1 of the exhaust duct 4 consists of a sintered compact 2 of aluminum titanate having a wall thickness of 2 mm, and of an envelope 3 of kaolinite fibers which are joined to the sintered compact 2 with aluminum titanate as binder. The thickness of the envelope 3 amounts to 5 mm. The density of the envelope amounts to 1.05 grams per cubic centimeter.

It will be understood that the specification and examples are illustrative but not limitative of the present invention and that other embodiments within the spirit and scope of the invention will suggest themselves to those skilled in the art.

What is claimed is:

1. In a thermal insulation lining of ceramic material for a hot gas duct enveloped in cast metal, especially in the cylinder head of an internal combustion engine, the improvement wherein said ceramic material is in the form of a sintered compact of ceramic material and includes a fiber envelope for said sintered compact comprising inorganic fibers and having a thickness of 1 to 7 mm and a density of 0.8 to 1.2 grams per cubic centimeter.

2. The thermal insulation lining of claim 1 wherein said fiber envelope consists essentially of inorganic fibers.

3. The thermal insulation lining of claim 1, wherein the inorganic fibers can withstand heat of up to at least 1500° C. for a short time before disintegrating.

4. The thermal insulation lining of claim 1 wherein the inorganic fibers are mineral fibers.

5. The thermal insulation lining of claim 1 wherein said inorganic fibers are mineral fibers of aluminum oxide, zirconium oxide, mullite or kaolinite.

6. The thermal insulation lining of claim 1 wherein said fiber envelope has a thickness of 2 to 6 mm.

7. The thermal insulation lining of claim 1 wherein the sintered compact is formed of mullite, zirconium oxide, magnesium auminum silicate, magnesium aluminum titanate, aluminum titanate or lithium aluminum silicate.

8. The thermal insulation lining of claim 1 wherein the fiber envelope consists of inorganic fibers and a ceramic material as binding agent for the inorganic fibers.

9. The thermal insulation lining of claim 1 consisting of a sintered compact of aluminum titanate which has an envelope formed from inorganic fibers and aluminum titanate.

10. A thermal insulation lining for a hot gas duct enveloped in metal, for use in the cylinder head of an internal combustion engine, comprising a sintered compact of ceramic material selected from the group consisting of mullite, zirconium oxide, magnesium aluminum silicate, magnesium aluminum titanate; aluminum titanate; or lithium aluminum silicate;

said sintered compact being enveloped in an inorganic fiber envelope having a thickness of 1 to 7 mm, a density of 0.8 to 1.2 grams per cubic centimeter and comprising mineral fibers selected from the group consisting of aluminum oxide, zirconium oxide, mullite or kaolinite, or said mineral fibers and said ceramic material as a binding agent.

11. A thermal insulation lining of ceramic material, for a hot gas duct enveloped in metal, for use in the cylinder head of an internal combustion engine, comprising a sintered compact of aluminum titanate enveloped in an inorganic fiber envelope having a thickness of 1 to 7 mm, a density of 0.8 to 1.2 grams per cubic centimeter and comprising mineral fibers selected from the group consisting of aluminum oxide, zirconium oxide, mullite or kaolinite, or said mineral fibers mixed with aluminum titanate as a binding agent.

12. A method for the production of thermal insulation lining of claim 1 wherein the inorganic fibers are sprayed onto the sintered compact from a slip containing a ceramic substance.

* * * * *